United States Patent Office 3,441,555
Patented Apr. 29, 1969

3,441,555
DISAZO PIGMENTS
Jack L. Towle, East Cleveland, and Anton Mudrak, Broadview Heights, Ohio, assignors to Kewanee Oil Company, Bryn Mawr, Pa., a corporation of Delaware
No Drawing. Filed Aug. 24, 1966, Ser. No. 574,540
Int. Cl. C09b 33/14
U.S. Cl. 260—176        5 Claims

ABSTRACT OF THE DISCLOSURE

A yellow disazo pigment of improved properties containing two lower alkyl sulfonamide groups, prepared by coupling two molar proportions of a diazotized aniline derivatives having a methoxy substituent in the two position and a lower alkyl sulfonamide group in the five position, with a para-phenylene-bisacetoacetamide derivative having at least two chlorine atoms substituted in the phenylene nucleus. These pigments are particularly useful for their non-bleeding properties, particularly in hot paraffin and in organic solvents that might be encountered in the printing of wax-coated wrappers.

---

This invention relates to a new water insoluble disazo pigment. More specifically, it relates to a new yellow disazo pigment of improved properties containing two lower alkyl sulfonamide groups. More specifically, it relates to an improved yellow pigment prepared by coupling of specific diazotized aniline sulfonamide derivatives with chlorinated-para-phenylene-bisacetoacetamide.

Yellow pigments are available for use in the printing of bread wrappers where light fastness is not a primary requisite because the wrappers are discarded after a few days of use. It is desirable, since these wrappers are used with food, and also for appearance sake, that pigments used for this purpose are non-bleeding, particularly with regard to hot paraffin, as well as with regard to any organic solvents that might be encountered in the printing of wax-coated wrappers. For applications in which the wrappers are exposed to light for extended periods, it is also desirable that the pigment also have good light fastness.

U.S. Patent 2,591,470 discloses azo dyestuffs derived by the coupling of certain types of acylacetic acid arylides with disazo components derived from amines of the naphthalene or benzene series. The acylacetic acid arylides of this patent have the general formula

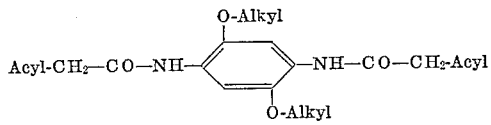

Products produced according to the procedure of the patent gives inconsistent and in some instances most unsatisfactory results with regard to light fastness, resistance to bleeding, etc.

In accordance with the practice of the present invention, it has now been found that improved yellow pigments having excellent light-fastness and resistance to bleeding in hot paraffin as well as other organic solvents can be produced by the coupling of a disazo compound derived from 3 - amino-4-methoxy-N′-propylbenzenesulfonamide with a N,N′-(p-phenylene)-bisacetoacetamide having at least two chlorine atoms attached to the phenylene nucleus.

This preparation is illustrated by the following reaction which represents the coupling used to produce the preferred compound of this invention.

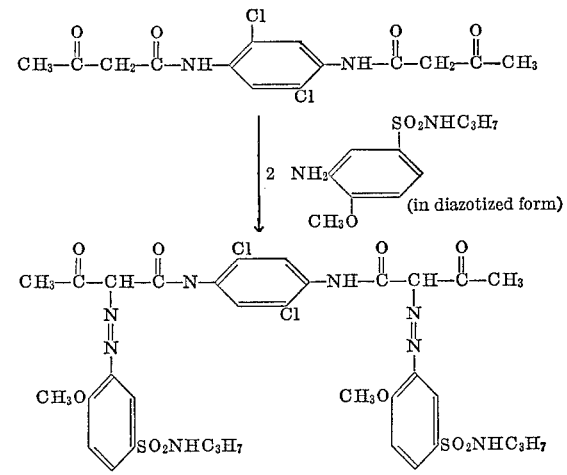

This coupling is advantageously effected at a temperature of 15–40° C., preferably 25–40° C., in a manner normally used for effecting coupling reactions.

Since the two or more chlorine atoms attached to the phenylene nucleus can be in various positions and since methyl or ethyl can replace the propyl group attached to the sulfonamide group, the generic formula for the compounds of this invention can be represented as:

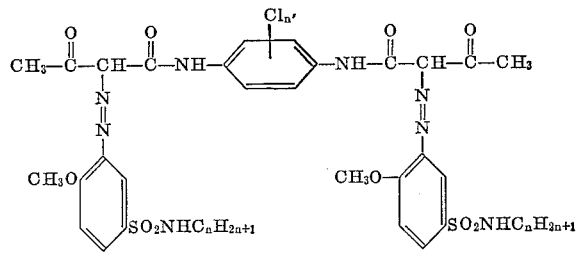

wherein $n$ is an integer having the value of 1–3 and $n'$ is an integer having a value of 2–4. The chlorine atoms can be positioned anywhere but in the 1 and 4 positions which are occupied by the amino nitrogens. Preferably there are two chlorine atoms and these are in the 2 and 5 positions as shown in the formula of the preferred compound above. Other possible positions for chlorine atoms on the phenylene nucleus are 2,3-, 2,6-, and also 2,3,5-trichloro and 2,3,5,6-tetrachloro. The propyl group in the preferred compound can be either isopropyl or n-propyl and the propyl group can also be replaced by either methyl or ethyl.

In addition to its insolubility in hot paraffin as well as other organic solvents, the new pigment of this invention is particularly distinctive in its light-fastness. This makes it very desirable for use in wax-coated wrappers which are to be exposed to light for extended periods, as well as other applications where both light fastness and non-bleeding are important.

The invention is best illustrated by the following examples. These are presented for the purpose of illustration and are not intended to restrict in any way the scope of the invention nor the manner in which the invention may be practiced. Unless specifically provided otherwise, parts and percentages are given by weight.

EXAMPLE I

To a reactor, equipped with heating and stirring means, are added 200 parts of water, 56 parts of concentrated hydrochloric acid and 48.8 parts of 3-amino-4-methoxy-N′-propyl-benzenesulfonamide. This mixture is warmed and stirred until the benzenesulfonamide derivative is completely dissolved. The solution is then cooled to 0° C.

and with good agitation a solution of 14 parts of sodium nitrite in 50 parts of water is gradually added below the surface of the solution. This liquid is then stirred for ½ hour at 0–3° C. and subsequently clarified by filtration. Excess nitrous acid is destroyed by the addition of a small amount of sulfamic acid. The resulting diazo solution is used in the procedure described immediately below.

In a suitable reactor, a solution is prepared containing 22 parts of sodium hydroxide, 8.3 parts of lauric diethanolamide, 60 parts of sodium acetate and sufficient water to make a total of 1,000 parts of solution. In this solution is dissolved 34.5 parts of N,N'-(2,5-dichloro-p-phenylene)-bisacetoacetamide. The diarylide is precipitated by adding 70 parts of 50% acetic acid under vigorous agitation. The resulting suspension is maintained at pH of 5–5.5 and at a temperature of 27–40° C. while the above described diazo solution is added gradually. After the coupling reaction is complete, the mixture is warmed to 75° C., then filtered and the resulting filter cake washed with water. Impurities are removed from the pigment in the filter cake by use of pyridine or other organic solvent such as tetrahydrofuran, xylene, etc.

The resulting pigment has high coloring strength, excellent bleeding resistance to solvents, and very good fastness to light. It is especially suitable for plastics, printing inks, lacquers, paints for pad dyeing of textiles and also for spin dyeing of viscose rayon and acetate rayon.

As indicated above, it is particularly useful in the printing of special wax-coated wrappers where light-fastness is important, and also where its resistance to bleeding is particularly important.

EXAMPLE II

The procedure of Example I is repeated a number of times using in place of the N,N'-(2,5-dichloro-p-phenylene)-bisacetoacetamide, the following compounds respectively:

(a) N,N'-(2,6-dichloro-p-phenylene)-bisacetoacetamide;
(b) N,N'-(2,3,5-trichloro-p-phenylene)-bisacetoacetamide; and
(c) N,N'-(2,3,5,6-tetrachloro-p-phenylene)-bisacetoacetamide.

In each case, the resulting yellow pigment has excellent non-bleeding and light-fastness properties.

EXAMPLE III

The procedure of Example I is repeated three times using in place of the 3-amino-4-methoxy-N'-propyl-benzenesulfonamide the corresponding compounds in which the propyl group is replaced by isopropyl, ethyl and methyl groups respectively. In each case the resulting yellow pigments have excellent resistance to bleeding and have very good light-fastness.

The invention claimed is:

1. A water-insoluble pigment having the formula

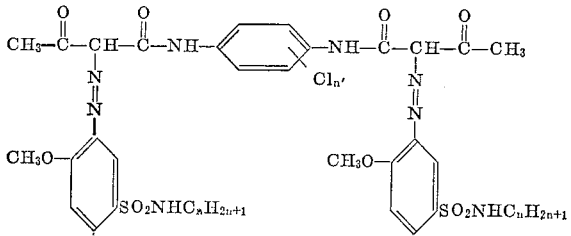

wherein $n$ represents an integer having a value of 1 to 3 and $n'$ represents an integer having a value of 2 to 4.

2. A water-insoluble pigment of claim 1 in which said pigment has the formula:

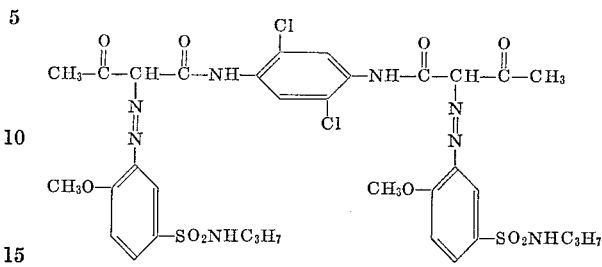

3. A water-insoluble pigment of claim 1 in which said pigment has the formula:

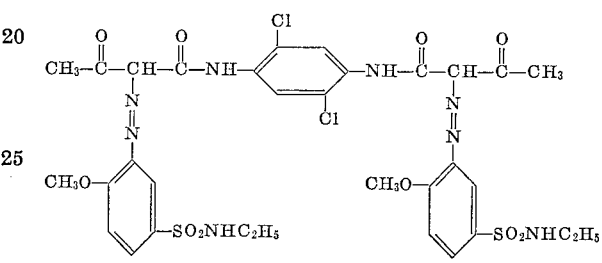

4. A water-insoluble pigment of claim 1 in which said pigment has the formula:

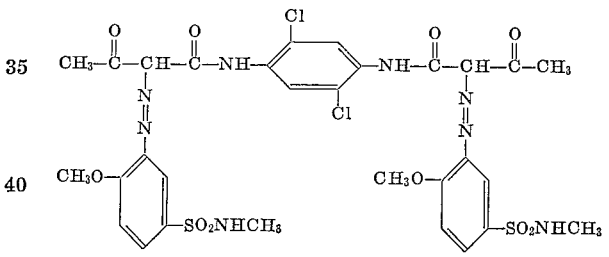

5. A water-insoluble pigment of claim 1 in which said pigment has the formula:

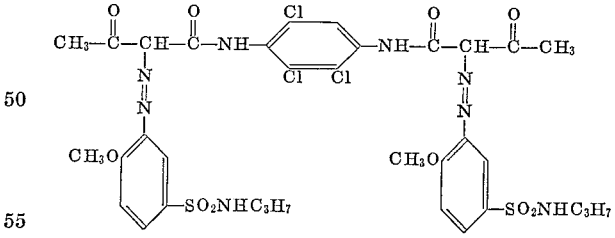

References Cited

UNITED STATES PATENTS 3,120,508   2/1964   Braun et al. _____ 260—176 X
3,218,311   11/1965  Forter et al. _____ 260—176 X CHARLES B. PARKER, *Primary Examiner.*

D. M. PAPUGA, *Assistant Examiner.*

U.S. Cl. X.R.

8—7; 117—154; 106—22; 260—37